United States Patent
Zuschlag et al.

(10) Patent No.: US 10,927,712 B2
(45) Date of Patent: Feb. 23, 2021

(54) WASTE HEAT RECOVERY SYSTEM

(71) Applicant: Robert Bosch GmbH, Stuttgart (DE)

(72) Inventors: Axel Zuschlag, Korntal-Münchingen (DE); Gregory Rewers, Schwieberdingen (DE); Michael Richter, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/333,498

(22) PCT Filed: Aug. 22, 2017

(86) PCT No.: PCT/EP2017/071117
§ 371 (c)(1),
(2) Date: Mar. 14, 2019

(87) PCT Pub. No.: WO2018/050410
PCT Pub. Date: Mar. 22, 2018

(65) Prior Publication Data
US 2019/0264580 A1    Aug. 29, 2019

(30) Foreign Application Priority Data
Sep. 16, 2016 (DE) ...................... 10 2016 217 764.8

(51) Int. Cl.
*F01K 23/06* (2006.01)
*F01K 9/00* (2006.01)
(Continued)

(52) U.S. Cl.
CPC ............ *F01K 23/065* (2013.01); *F01K 9/003* (2013.01); *F01K 23/10* (2013.01); *F01K 23/101* (2013.01);
(Continued)

(58) Field of Classification Search
CPC .... F02B 29/0406; F02B 29/0425–0443; F01K 23/065; F01K 23/10; F01K 23/101
(Continued)

(56) References Cited

U.S. PATENT DOCUMENTS 5,321,944 A * 6/1994 Bronicki ................. F01K 23/10
60/728
2011/0048012 A1 3/2011 Ernst et al.
(Continued)

FOREIGN PATENT DOCUMENTS

AT         507096 A4    2/2010
DE      102013205648    2/2010
(Continued)

OTHER PUBLICATIONS

International Search Report for Application No. PCT/EP2017/071117 dated Oct. 17, 2017 (English Translation, 2 pages).

*Primary Examiner* — Mark A Laurenzi
*Assistant Examiner* — Mickey H France
(74) *Attorney, Agent, or Firm* — Michael Best & Friedrich LLP

(57) ABSTRACT

The invention relates to a waste heat recovery system (3) for an internal combustion engine (1), having a working fluid circuit (19) with a condenser (31) that is also connected to a working fluid cooling circuit (34), and wherein the working fluid cooling circuit (34) has a cooler (35). The invention provides a waste heat recovery system (3) having a working fluid cooling circuit (34) which is improved in comparison to one design of a working fluid cooling circuit (34). This is achieved by the working fluid cooling circuit (34) having a cooler bypass (46). This configuration makes it generally possible for part of the coolant volume flow to be routed past the cooler (35). This is advantageous in particular at low
(Continued)

temperatures since otherwise very low pressures arise in the working fluid cooling circuit (34).

18 Claims, 5 Drawing Sheets

(51) Int. Cl.

| | | |
|---|---|---|
| *F01K 23/10* | (2006.01) | |
| *F01N 5/02* | (2006.01) | |
| *F01P 9/06* | (2006.01) | |
| *F02G 5/02* | (2006.01) | |

(52) U.S. Cl.
CPC .................. *F01N 5/02* (2013.01); *F01P 9/06* (2013.01); *F02G 5/02* (2013.01); *Y02T 10/12* (2013.01)

(58) Field of Classification Search
USPC ............. 60/614–620, 623; 123/41.09, 41.08, 123/41.1, 41.2, 41.21, 41.25
See application file for complete search history.

(56) References Cited

U.S. PATENT DOCUMENTS

| | | | | |
|---|---|---|---|---|
| 2013/0298852 | A1* | 11/2013 | Quix | F01P 3/02 123/41.72 |
| 2015/0276284 | A1* | 10/2015 | Waibel | F01K 23/065 165/104.31 |
| 2015/0361832 | A1* | 12/2015 | Franke | F01K 23/065 60/650 |
| 2016/0053666 | A1* | 2/2016 | Bruemmer | F01P 5/10 123/41.1 |
| 2016/0076403 | A1* | 3/2016 | Haraguchi | F01K 23/14 60/618 |
| 2017/0183979 | A1* | 6/2017 | Joshi | F01K 23/04 |

FOREIGN PATENT DOCUMENTS

| | | |
|---|---|---|
| DE | 102012209811 | 12/2013 |
| DE | 102014019684 | 6/2015 |
| DE | 102014204257 A1 | 9/2015 |
| DE | 202014005513 U1 | 10/2015 |

* cited by examiner

WASTE HEAT RECOVERY SYSTEM

BACKGROUND OF THE INVENTION

The invention relates to a waste heat recovery system for an internal combustion engine, having a working-fluid circuit with a condenser, which is furthermore connected to a working-fluid cooling circuit, and wherein the working-fluid cooling circuit has a cooler.

A waste heat recovery system of this type for an internal combustion engine is known from DE 10 2013 205 648 A1. Here, a working-fluid circuit of the waste heat recovery system has a vaporizer connected into an exhaust gas line of the internal combustion engine, an expansion machine, a condenser and a working-fluid pump. The condenser has a working-fluid cooling supply line and a working-fluid cooling discharge line, which can form a separate working-fluid cooling circuit with a cooler or can be connected to a coolant circuit of the internal combustion engine. In this case, a bypass which can be controlled by a bypass valve is arranged between the working-fluid cooling supply line and the working-fluid cooling discharge line.

A further waste heat recovery system is known from DE 10 2014 019 684 A1. This waste heat recovery system has a working-fluid circuit, which cooperates with a heat exchanger connected into a coolant circuit of an internal combustion engine. The internal combustion engine has a cooling system with the coolant circuit and with at least one coolant pump and a coolant cooler. In this case, the heat exchanger is a condenser which is connected directly into the working-fluid circuit.

SUMMARY OF THE INVENTION

The invention is based on the object of providing a waste heat recovery system with a working-fluid cooling circuit, which is improved in terms of the design of a working-fluid cooling circuit.

This object is achieved in that the working-fluid cooling circuit has a cooler bypass. As a result of this design, some of the coolant volume flow flowing through the working-fluid cooling circuit can, in general, bypass the cooler. This is advantageous in particular at low temperatures since very low pressures are otherwise generated in the working-fluid cooling circuit. These low pressures in turn mean high demands on the components and the fill quantity of the working-fluid cooling circuit. In addition, heat in the condenser can only be extracted with great difficulty at low pressures in the working-fluid cooling circuit. Consequently, the working-fluid cooling circuit is thus improved in general in terms of regulation.

In a further development of the invention, the cooler bypass has a cooler bypass control valve. The distribution of the flow through the cooler and/or the cooler bypass can thus be adjusted or divided as required.

In a further configuration of the invention, the cooler bypass control valve is arranged on the input side or the output side of the cooler bypass in the working-fluid cooling circuit. It is thus possible to take into account specific properties of a working-fluid cooling circuit, for example.

In an advantageous further development of the invention, the cooler bypass control valve is a 3-way valve, a thermostat or other valve which is activated, or not activated, as required. The choice is also made depending on the respective properties here.

In a further development of the invention, the working-fluid cooling circuit has a separate working-fluid cooling pump. This configuration will be used in particular in an independent working-fluid circuit. However, a working-fluid cooling pump can essentially also be provided when the working-fluid cooling circuit is connected to a cooling circuit of the internal combustion engine, which connection is in turn provided in a further configuration.

In summary, the following advantages are achieved:

As a result of the cooler bypass, a further degree of freedom is generated when regulating the coolant temperature in the working-fluid cooling circuit.

The coolant volume flow and the coolant temperature can be regulated independently of one another, for example by the speed of the separate working-fluid cooling pump for the working-fluid cooling circuit or the admix level in the case of a combination with the coolant circuit (without a separate working-fluid cooling pump).

The heating phase of the working-fluid cooling circuit can be reduced.

The system is not dependent on lower ambient temperatures and it is possible to prevent low pressure from arising and the sensitivity to the fill quantity of the working-fluid cooling circuit is lower.

In the case of a coupled working-fluid cooling circuit and coolant circuit, the prerequisite for rapid heating of the coolant of the coolant circuit via waste gas heat is possible.

In a further configuration of the invention, the working-fluid cooling circuit has a condenser bypass to the condenser which, in a further configuration, can in turn have a condenser bypass control valve which is arranged and designed as required. The working-fluid cooling circuit is also improved in particular in terms of regulation as a result of these configurations.

The advantages of the condenser bypass are:

A decoupling of the volume flow in the cooler and in the condenser takes place, whereby a more flexible and, at the same time, requirement-based cooling capacity shift and cooling of the working-fluid cooling circuit is possible. Therefore, a more simple requirement-based increase in the cooling surface of the coolant cooler is possible.

This is linked to the advantage that, as a result of shifting the cooling requirement from the coolant circuit into the working-fluid cooling circuit, it is possible to avoid or delay the implementation of a fan. Therefore, by completely bypassing the condenser, it is for example possible to briefly use all cooling capacities for cooling the vehicle, i.e. for the coolant circuit.

Free cooling capacities in the working-fluid cooling circuit can be used for the coolant circuit without an increase in the volume flow of the coolant in the condenser or possible pressure losses. This is advantageous in that, despite the qualification of the working-fluid cooling circuit for the coolant circuit, a separate construction of the condenser for higher volume flows, for example, is unnecessary.

BRIEF DESCRIPTION OF THE DRAWINGS

Further advantageous configurations of the invention are revealed in the description of the drawing, in which exemplary embodiments of the invention, which are illustrated in the figures, are described in more detail.

The drawing shows.

DETAILED DESCRIPTION

Figure 1:
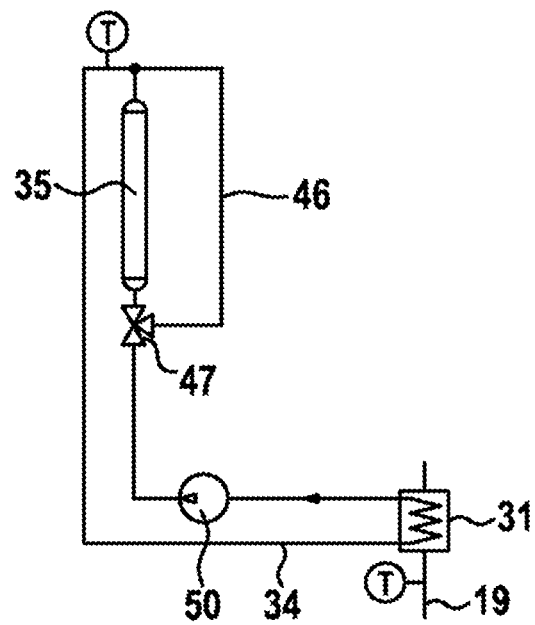
FIG. 1 a working-fluid cooling circuit of a waste heat recovery system with a cooler bypass in a first embodiment.
Figure 2:
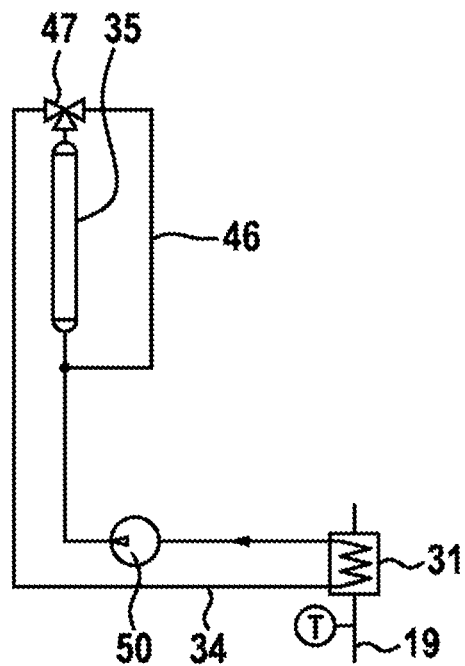
FIG. 2 a working-fluid cooling circuit with a cooler bypass in a second embodiment.

FIGS. 1 and 2 show different configurations of a working-fluid cooling circuit 34 of a waste heat recovery system 3 of an internal combustion engine 1 with a cooler bypass 46 with respect to a cooler 35, which cooler bypass is controlled by a cooler bypass control valve 47. The working-fluid cooling circuit 34 can be an independent circuit with a separate working-fluid cooling pump 50 or it can be combined with a coolant circuit 20 of the internal combustion engine 1 with or without a separate working-fluid cooling pump 50—as illustrated in FIGS. 5 to 8. The same applies analogously to the working-fluid cooling circuit 34 (shown in FIGS. 3 and 4 in each case) with a condenser bypass 44. The complete waste heat recovery system 3 is explained in particular in conjunction with FIG. 5.

As a result of the cooler bypass 46, it is possible for some of the volume flow of the coolant, which can be cooling water for example, circulating through the working-fluid cooling circuit 34 to bypass the cooler 35, whilst the entire volume flow is conducted through a condenser 31, which is in turn integrated in a working-fluid circuit 19 of the waste heat recovery system 3. Bypassing the cooler 35 is advantageous at low temperatures since very low pressures are otherwise generated in the working-fluid cooling circuit 34. These pressures in turn mean high demands on the components and on the fill quantity. In addition, heat in the condenser 31 can only be extracted with great difficulty at low pressures in the working-fluid cooling circuit 34. A counter-measure would be to significantly reduce the mass flow in the working-fluid cooling circuit 34 or the additional pump. However such a measure is inadequate at very low coolant temperatures in the working-fluid cooling circuit 34, which is why "bypassing" the cooler 35 via the cooler bypass 46 is advantageous. The cooler bypass control valve 47 can be controlled actively, for example via the control device 37, and passively, for example in the case of a design as a thermostat. The cooler bypass control valve 47 can be installed both downstream and upstream of the cooler 35 in the working-fluid cooling circuit 34. Any combination of the type of cooler bypass control valve 47 (passive or active) and any installation point (downstream, upstream of the cooler 35) is possible.

Figure 3:
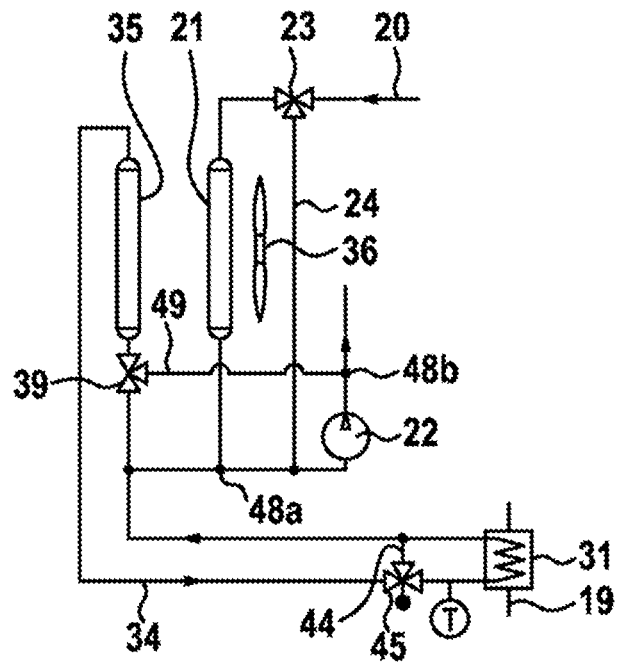
FIG. 3 a working-fluid cooling circuit with a condenser bypass in a first embodiment.
Figure 4:
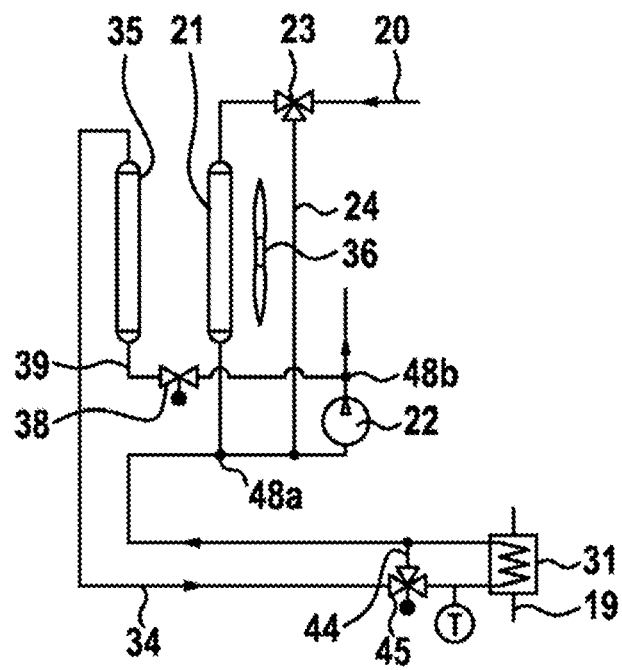
FIG. 4 a working-fluid cooling circuit with a condenser bypass in a second embodiment.

The detailed views shown in FIGS. 3 and 4 essentially show embodiments of the working-fluid cooling circuit 34 which are already described above, wherein, in both figures, the working-fluid cooling circuit 34 has a condenser bypass 44 with respect to the condenser 31, which is controlled by a condenser bypass control valve 45, and the working-fluid cooling circuit 34 here is combined with the coolant circuit 20 in each case without a separate working-fluid cooling pump 50. However, as described above, the working-fluid cooling circuit 34 can, in each case, also be an independent circuit with a separate working-fluid cooling pump 50. The condenser bypass control valve 45 can be controlled both actively, for example via a control device 37 (see FIG. 5), or passively in the form of a thermostat. The condenser bypass control valve 45 can be installed both downstream and upstream of the condenser 31 in the working-fluid cooling circuit 34. Any combination of valve type (passive or active) and any installation point (downstream, upstream) is essentially possible. The use of this condenser bypass 44 is also not dependent on whether the working-fluid cooling circuit 34 and the coolant circuit 20 are connected in parallel or in series (as explained below) relative to the coolant pump 22.

Figure 5:
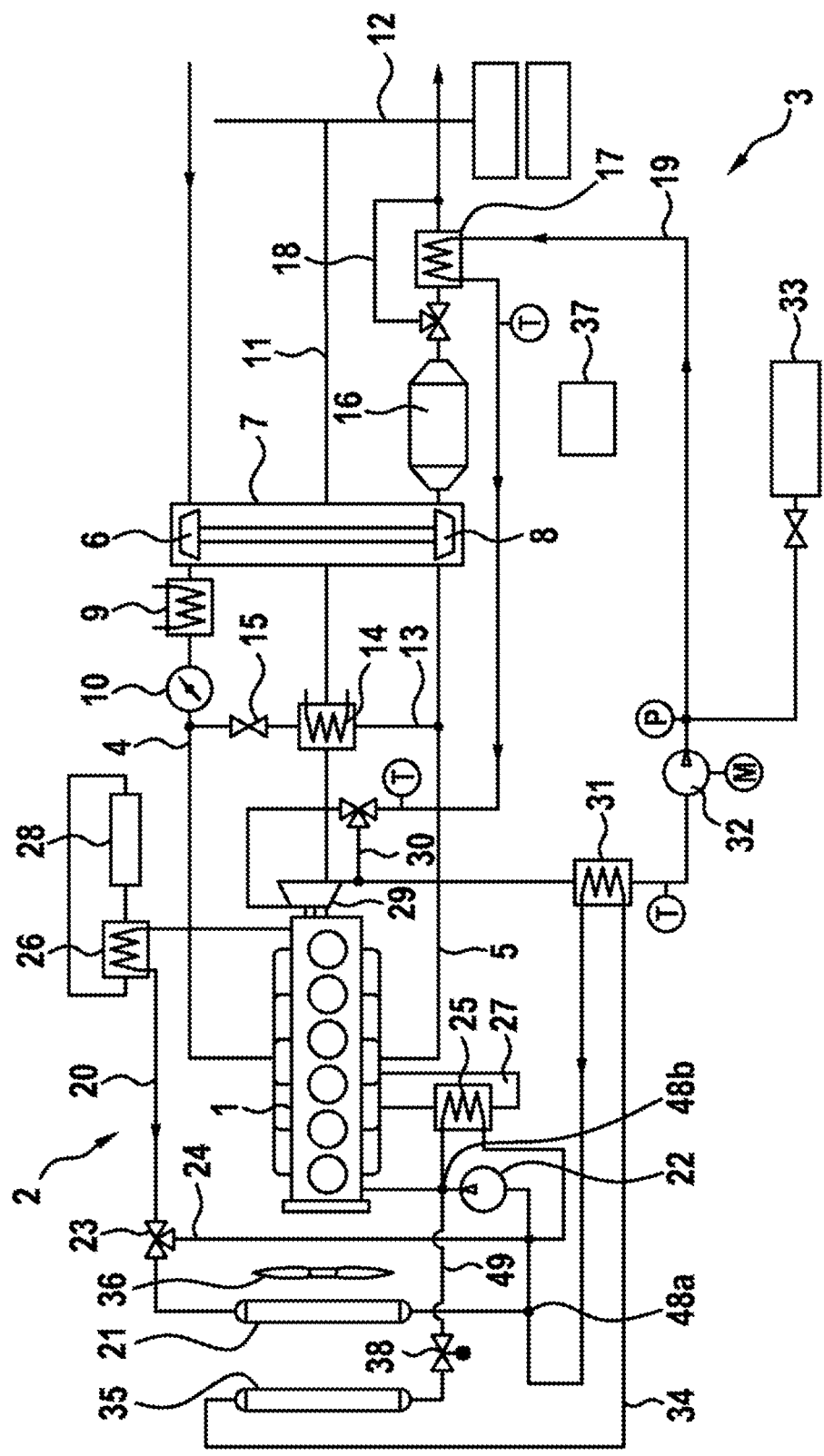
FIG. 5 a schematic circuit diagram of a waste heat recovery system with a working-fluid circuit and a working-fluid cooling circuit, which is connected to a coolant circuit of a cooling system of an internal combustion engine, in a first embodiment.

FIG. 5 shows the waste heat recovery system 3, which is installed in an internal combustion engine 1 with a cooling system 2. The internal combustion engine 1 furthermore has an unburned gas line 4 and an exhaust gas line 5. Via the unburned gas line 4, the internal combustion engine 1 is supplied with combustion air which, in the exemplary embodiment, is compressed by the compressor 6 of an exhaust gas turbocharger 7, which is in turn driven by a turbine 8 connected into the exhaust gas line 5. An intercooler 9 and a throttle valve 10 are connected downstream of the compressor 6. The unburned gas, which is supplied to individual combustion chambers of the internal combustion engine 1 with a simultaneous supply of fuel, for example diesel fuel, burns in combustion chambers of the internal combustion engine 1, generating working power which, for example, via a drive shaft 11 connected to the crankshaft of the internal combustion engine 1 with the interconnection of a gear, is delivered to a drive axle 12 for driving any vehicle in which the internal combustion engine 1 is installed. Via the exhaust gas line 5, the mix of fuel and unburned gas which is burned in the combustion chambers of the internal combustion engine 1 is ultimately discharged to the environment as hot exhaust gas. The exhaust gas line 5 is connected to the unburned gas line 4 via an exhaust gas return line 13 with an interconnected exhaust gas return cooler 14 and an exhaust gas return valve 15. Via the exhaust gas return line 13, exhaust gas is returned to the unburned gas line 4 in a controlled manner, in particular to reduce the harmful exhaust gas emissions. An exhaust gas post-treatment device 16, which has a soot filter and/or catalytic converter for example, is connected downstream of the turbine 8. The exhaust gas post-treatment device 16 is likewise provided to reduce the harmful exhaust gas emissions. A heat exchanger in the form of a super-heater 17 of the waste heat recovery system 3 is connected into the exhaust gas line 5 further downstream, which heat exchanger can be bypassed in a controlled manner via an exhaust gas line bypass 18. The super-heater 17 is integrated in a working-fluid circuit 19 of the waste heat recovery system 3—as will be explained more precisely below.

The internal combustion engine 1 furthermore has the cooling system 2 with the coolant circuit 20. The cooling system 2 serves for cooling the internal combustion engine 1 and has a coolant cooler 21 installed in the coolant circuit 20 and a coolant pump 22. The coolant pump 22 delivers the coolant through cooling chambers of the internal combustion engine 1 into the coolant cooler 21, which is connected on the output side to the intake side of the coolant pump 22. The coolant cooler 21 can be bypassed via a coolant bypass 24 controlled by a coolant bypass valve 23. The passage through the coolant bypass 24 is connected in particular in the case of cold coolant and a cold internal combustion engine 1 in order to rapidly reach the operating temperature of the coolant and the internal combustion engine 1. A lubricating oil heat exchanger 25 and a retarder heat exchanger 26 are furthermore integrated in the coolant circuit 20. The lubricating oil of the internal combustion engine which circulates through a lubricating oil circuit 27 is cooled in the lubricating oil heat exchanger 25, whilst a working hydraulic fluid circulating through a retarder 28 is cooled in the retarder heat exchanger 26. The retarder 28 is connected to the drive shaft 11, for example. The lubricating oil heat exchanger 25 and the retarder heat exchanger 26 can be connected into the coolant circuit 20 as illustrated or in another configuration. The intercooler 9 and the exhaust gas return cooler 14 are furthermore integrated in the coolant circuit 20 in a suitable manner.

Coming back to the waste heat recovery system 3, this has the working-fluid circuit 19 with the super-heater 17 connected into the exhaust gas line 5. An expansion machine 29 is furthermore connected in the working-fluid circuit 19, which expansion machine, with the expansion of the working fluid which is converted into the gaseous state in the super-heater 17, is driven by the said working fluid and delivers working power to the internal combustion engine 1 or another machine, for example a generator. In this case, the expansion machine 29 can be bypassed via a controlled working fluid bypass 30. The condenser 31, in which the working fluid is normally re-cooled into the liquid state and subsequently supplied to a working-fluid pump 32, is furthermore connected into the working-fluid circuit 19 downstream of the expansion machine 29. The working-fluid pump 32 is driven electrically, for example, and delivers the re-cooled working fluid back to the super-heater 17. In this case, a pressure compensation tank 33 is connected in the working-fluid circuit 19 on the output side of the working fluid pump 32.

The condenser 31 mentioned above is itself a component part of the working-fluid cooling circuit 34, which is described in conjunction with the previous figures and has the cooler 35. The cooler 35 is arranged upstream or downstream of the coolant cooler 21, for example, and has a cooling-air flow flowing through it, which is caused, for example by a fan 36 driven directly or indirectly by the internal combustion engine 1.

In the configuration of the system as a whole which is illustrated in FIG. 5, the working-fluid cooling circuit 34 is connected to the coolant circuit 20 and the working-fluid cooling circuit 34 and the coolant circuit 20 have a common coolant pump 22 for a common coolant. This saves on a separate working-fluid cooling pump 50 (FIGS. 1 and 2) for the working-fluid cooling circuit 34. The various options for the interconnection of the coolant circuit 20 and the working-fluid cooling circuit 34 are explained in more detail below.

To control the internal combustion engine 1 and the components described above and possibly also further components such as the fuel injection system, an electronic control device 37 is present, which controls the system as a whole, for example according to driver input and status variables of the system as a whole, for example temperature measurements T and pressure measurements p, which are recorded at random points.

In the embodiment illustrated in FIG. 5, the working-fluid cooling circuit 34 on the output side of the condenser 31 is connected to the coolant circuit 20 on the intake side of the cooling pump 22 via a connection 48*a*.

On the delivery side of the coolant pump 22, the working-fluid cooling circuit 34 is likewise connected to the coolant circuit 20 here via a connection 48*b*, wherein, on the delivery side of the coolant pump 22 and the connection 48*b*, in the supply line 49 to the cooler 35, a valve 38 is connected into the working-fluid cooling circuit 34. In the connection 48*b*, the common coolant of the working fluid cooling circuit 34 and the coolant circuit 20 is at a similar temperature level. If the valve 38 is open, a defined quantity of coolant is delivered from the coolant pump 22 into the coolant circuit 20 and the working-fluid cooling circuit 34. By progressively closing the valve 38, the quantity of the coolant circulating through the working-fluid cooling circuit 34 is reduced until it is shut off completely. In the configuration illustrated in FIG. 5 and described above, the coolant circuit 20 and the working-medium circuit 34 are connected in parallel to one another relative to the common coolant pump 22. The advantage of these described configurations is that:

A separate working-fluid cooling pump 50 for the working-fluid cooling circuit 34 is omitted; its function is assumed by the coolant pump 22.

Further components in the working-fluid cooling circuit 34 are omitted, such as a compensation tank, connections for filling and venting the working-fluid cooling circuit 34 and other components, for example.

There is an easing of safety requirements, which would be necessary, for example, if using an additional electric working-fluid cooling pump 50 for the working-fluid cooling circuit 34, since the vehicle also has to stop if the mechanical coolant pump 22 fails.

The use of a very high mass flow through the coolant circuit 20 is possible. The, for example, electrically operated separate working-fluid cooling pump 50 for the working-fluid cooling circuit 34 is typically limited to a delivery rate of two kilograms per second. At a higher ambient temperature and with a high load of the waste heat recovery system 3, this could be inadequate for preventing the boiling temperature of the coolant of the working-fluid cooling circuit from being exceeded.

An essential prerequisite for rapid heating of the coolant circuit 20 via exhaust gas heat is fulfilled.

The cooler can be additionally used together with the waste heat recovery system 3 for efficient cooling of the internal combustion engine 1 and for optimizing the overall efficiency of the internal combustion engine 1.

If the waste heat recovery system 3 is not active or if it still has reserves in the working-fluid cooling circuit 34, this latter can likewise be used for cooling the internal combustion engine 1. This offers the option of using cooling system capacities from the coolant circuit 20 and the working-fluid cooling circuit 34 as required and the implementation of the fan 36 can therefore be delayed or averted.

When the waste-heat recovery system 3 is switched off, a virtual increase in the cooling surfaces of the cooling system 2 of the internal combustion engine 1 is possible.

The connection (reproduced in a detailed illustration in FIG. 6) of the working-fluid cooling circuit 34 to the coolant circuit 20 differs from that of FIG. 5 in that, although the working-fluid cooling circuit 34 here is likewise connected to the coolant circuit 20 on the delivery side of the coolant pump 22 via the connection 48*a*, a valve 38 is not present here in the supply line 49 to the cooler 35. Instead of this, a 3-way valve 39, designed as a thermostat, is arranged upstream of the intake-side connection 48*a* in the working-fluid cooling circuit 34, the preferably third connection of which valve is connected, via a connecting line 40, to the supply line 49 to the cooler 35 downstream of the delivery-side connection 48a. A non-return valve 41 which opens in the direction of the cooler 35 is integrated in the connecting line 40. Therefore, a defined volume flow of coolant can be conducted from the working-fluid cooling circuit 34 into the coolant circuit 20 via the 3-way valve 39 designed as a thermostat, whilst the connecting line 40 with the non-return valve 41 forms a bypass with respect to the connections 48a, 48b. This therefore means that the working-fluid cooling circuit 34 can be shut off from the coolant circuit 20 in a corresponding position of the 3-way valve 39 and, consequently, coolant does not flow through the working-fluid cooling circuit 34.

Figure 7:
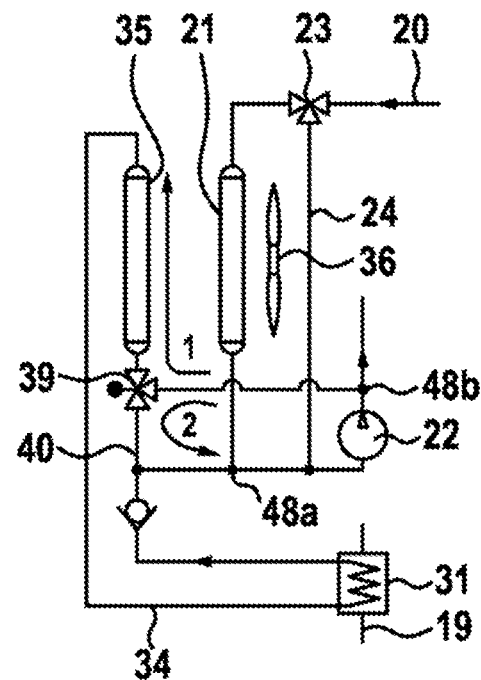
FIG. 7 a detailed view of a coupling of a working-fluid cooling circuit to a coolant circuit in a further embodiment.

In the exemplary embodiment according to FIG. 7, the working-fluid cooling circuit 34 is again connected as described above to the coolant circuit 20 on the delivery side and the intake-side of the coolant pump 22 via connections 48a, 48b, wherein the 3-way valve 39 is arranged in the supply line 49 here upstream of the cooler 35. The preferably third connection of the 3-way valve 39 is also preferably connected here to the intake side of the coolant pump 22 via the connecting line 40 via the connection 48a. Depending on the position of the 3-way valve 39, coolant is delivered through the cooler 35 (according to arrow 1) or through the connecting line 40 (arrow 2) back to the intake side of the coolant pump 22. In this case, the volume flow of the coolant removed via the connection 48b is virtually identical in all positions of the 3-way valve 39. To prevent working coolant being delivered on the incorrect path back to the condenser 31, the non-return valve 41 is arranged on the output side of the condenser 31 in that line of the working-fluid cooling circuit 34 which leads to the connecting line 40 or connection 48a. The 3-way valve 39 in the exemplary embodiments according to FIGS. 2 and 3 can be a complex valve or comprise a plurality of valves.

Figure 6:
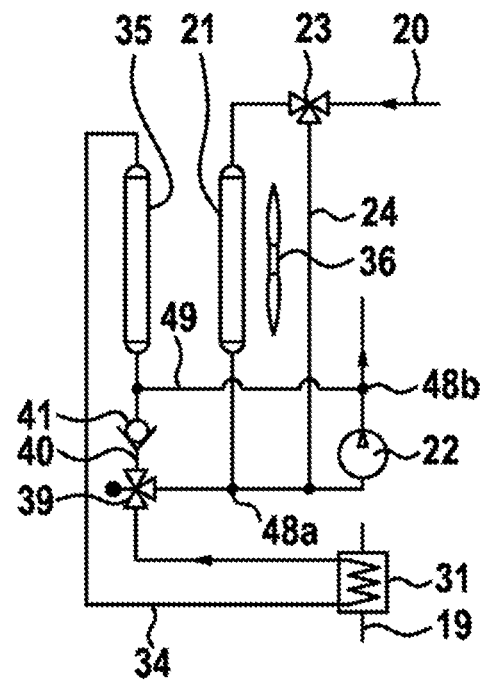
FIG. 6 a detailed view of a coupling of a working-fluid cooling circuit to a coolant circuit in a further embodiment.
Figure 8:
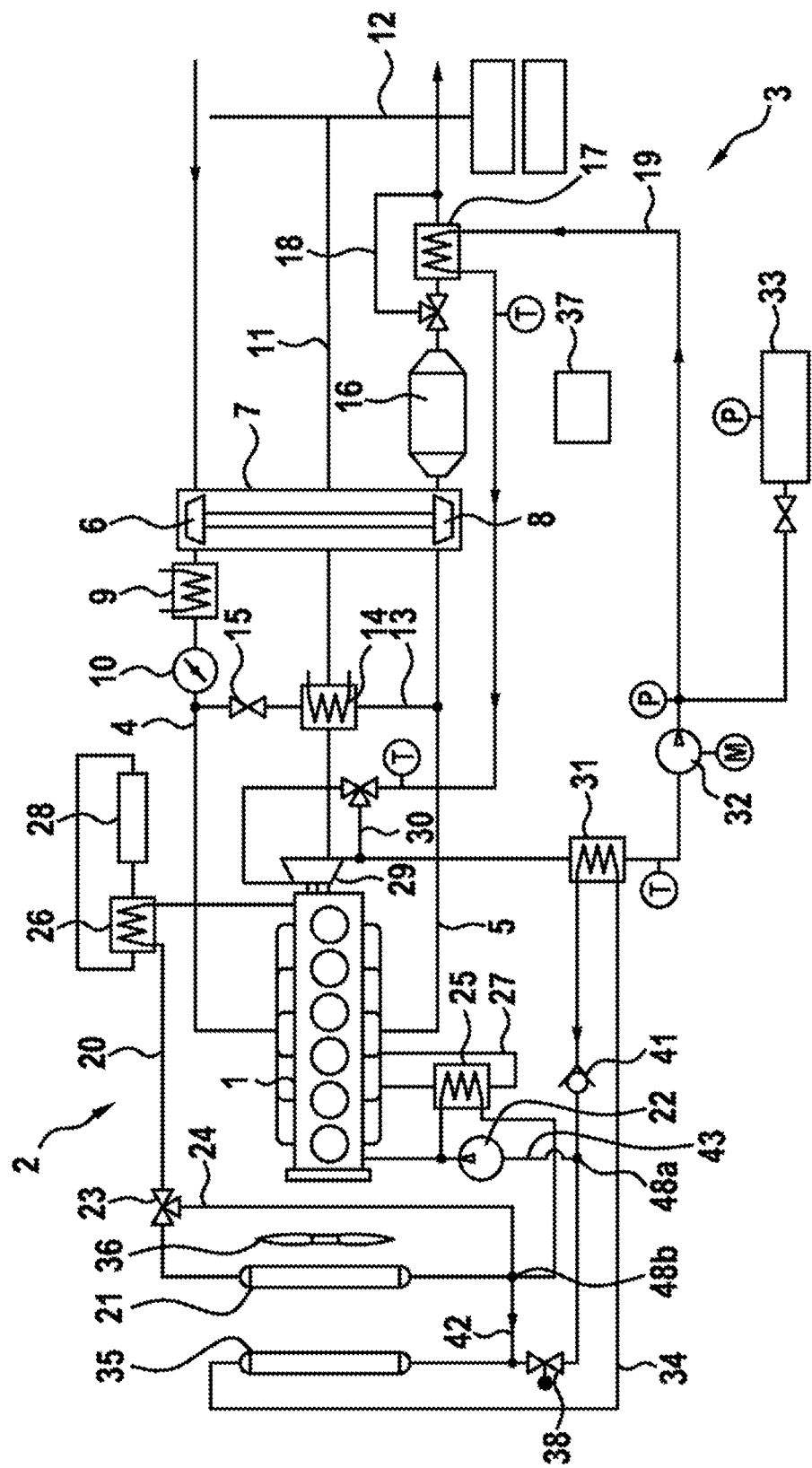
FIG. 8 a schematic circuit diagram of a waste heat recovery system with a working-fluid circuit and a working-fluid cooling circuit, which is connected to a coolant circuit of a cooling system of an internal combustion engine, in a further embodiment.

Whilst, in the exemplary embodiments of FIGS. 5 to 7, the working-fluid cooling circuit 34 and the coolant circuit 20 are connected in parallel to one another relative to the coolant pump 22, they are connected in series to one another in the exemplary embodiment according to FIG. 8. Here, the coolant pump 22 delivers coolant through the internal combustion engine 1 and then through the coolant cooler 21 or the coolant bypass 24. Then the connection 48b to the working-fluid cooling circuit 34 upstream of the cooler 35 takes place via a connecting line 42. The mass flow of the coolant through the working-fluid cooling circuit 34 is adjusted by the valve 38 arranged downstream of the outlet of the connecting line 42 which leads into the working-fluid cooling circuit 34. To ensure that coolant delivered by the coolant pump 22 also flows through the cooler 35 and then through the condenser 31, in particular when the valve 38 is fully open, a non-return valve 41 is arranged downstream of the connection 48a of an intake connecting line 43, which connects the working-fluid cooling circuit 34 to the coolant pump 22 on the intake side. The illustrated system otherwise corresponds to the system illustrated in FIG. 1.

It is finally pointed out that any of the individual features described above can be combined amongst one another and with one another.

The invention claimed is:

1. A waste heat recovery system (3) for an internal combustion engine (1), the waste heat recovery system having a working-fluid circuit (19) that conducts a working fluid and that includes a condenser (31) wherein the condenser is connected to a working-fluid cooling circuit (34) that conducts a coolant and that is separate from the working-fluid circuit (19) such that the working fluid and the coolant do not mix, and wherein the working-fluid cooling circuit (34) has a cooler (35), characterized in that the working-fluid cooling circuit (34) has a cooler bypass (46), wherein the working-fluid cooling circuit (34) is independent from a coolant circuit (20) of the internal combustion engine (1), wherein the working-fluid cooling circuit (34) includes a retarder heat exchanger (26) configured to cool hydraulic fluid from a retarder (28) of the internal combustion engine (1).

2. The waste heat recovery system (3) as claimed in claim 1, characterized in that the cooler bypass (46) has a cooler bypass control valve (47).

3. The waste heat recovery system (3) as claimed in claim 2, characterized in that the cooler bypass control valve (47) is arranged on an input side of the cooler bypass (46) in the working-fluid cooling circuit (34).

4. The waste heat recovery system (3) as claimed in claim 2, characterized in that the cooler bypass control valve (47) is arranged on an output side of the cooler bypass (46) in the working-fluid cooling circuit (34).

5. The waste heat recovery system (3) as claimed in claim 2, characterized in that the cooler bypass control valve (47) is a 3-way valve.

6. The waste heat recovery system (3) as claimed in claim 2, characterized in that the cooler bypass control valve (47) is a thermostat.

7. The waste heat recovery system (3) as claimed in claim 1, characterized in that the working-fluid cooling circuit (34) has a working-fluid cooling pump (50).

8. The waste heat recovery system (3) as claimed in claim 1, characterized in that the working-fluid cooling circuit (34) has a condenser bypass (44) with respect to the condenser (31).

9. The waste heat recovery system (3) as claimed in claim 8, characterized in that the condenser bypass (44) has a condenser bypass control valve (45).

10. A waste heat recovery system (3) for an internal combustion engine (1), the waste heat recovery system having a working-fluid circuit (19) that conducts a working fluid and that includes a condenser (31) wherein the condenser is connected to a working-fluid cooling circuit (34) that conducts a coolant and that is separate from the working-fluid circuit (19) such that the working fluid and the coolant do not mix, and wherein the working-fluid cooling circuit (34) has a cooler (35), characterized in that the working-fluid cooling circuit (34) has a cooler bypass (46), wherein the working-fluid cooling circuit (34) is independent from a coolant circuit (20) of the internal combustion engine (1), wherein the working-fluid cooling circuit (34) includes a lubricating oil heat exchanger (25) configured to cool lubricating oil from the internal combustion engine (1).

11. The waste heat recovery system (3) as claimed in claim 10, characterized in that the cooler bypass (46) has a cooler bypass control valve (47).

12. The waste heat recovery system (3) as claimed in claim 11, characterized in that the cooler bypass control valve (47) is arranged on an input side of the cooler bypass (46) in the working-fluid cooling circuit (34).

13. The waste heat recovery system (3) as claimed in claim 11, characterized in that the cooler bypass control valve (47) is arranged on an output side of the cooler bypass (46) in the working-fluid cooling circuit (34).

14. The waste heat recovery system (3) as claimed in claim 11, characterized in that the cooler bypass control valve (47) is a 3-way valve.

15. The waste heat recovery system (3) as claimed in claim 11, characterized in that the cooler bypass control valve (47) is a thermostat.

16. The waste heat recovery system (3) as claimed in claim 10, characterized in that the working-fluid cooling circuit (34) has a working-fluid cooling pump (50).

17. The waste heat recovery system (3) as claimed in claim 10, characterized in that the working-fluid cooling circuit (34) has a condenser bypass (44) with respect to the condenser (31).

18. The waste heat recovery system (3) as claimed in claim 17, characterized in that the condenser bypass (44) has a condenser bypass control valve (45).

\* \* \* \* \*